(12) United States Patent
Demir et al.

(10) Patent No.: US 10,411,819 B1
(45) Date of Patent: Sep. 10, 2019

(54) SYSTEM AND METHOD FOR ADAPTIVE OFDM GUARDS

(71) Applicants: Ali Faith Demir, Tampa, FL (US); Huseyin Arslan, Tampa, FL (US)

(72) Inventors: Ali Faith Demir, Tampa, FL (US); Huseyin Arslan, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 16/024,051

(22) Filed: Jun. 29, 2018

Related U.S. Application Data

(60) Provisional application No. 62/563,935, filed on Sep. 27, 2017.

(51) Int. Cl.
| | |
|---|---|
| *H04B 17/336* | (2015.01) |
| *H04J 11/00* | (2006.01) |
| *H04W 72/08* | (2009.01) |
| *H04L 5/00* | (2006.01) |
| *H04W 72/04* | (2009.01) |

(52) U.S. Cl.
CPC .......... *H04B 17/336* (2015.01); *H04J 11/003* (2013.01); *H04L 5/0053* (2013.01); *H04W 72/0453* (2013.01); *H04W 72/082* (2013.01)

(58) Field of Classification Search
CPC .... H04B 17/336; H04J 11/003; H04L 5/0053; H04W 72/0453; H04W 72/082
See application file for complete search history.

(56) References Cited

U.S. PATENT DOCUMENTS

| | | |
|---|---|---|
| 9,106,324 B1 | 8/2015 | Mahmoud et al. |
| 9,426,010 B1 | 8/2016 | Mahmoud et al. |
| 2017/0303274 A1* | 10/2017 | He ...................... H04W 72/082 |

OTHER PUBLICATIONS

Guvenkaya et al., A Windowing Technique for Optimal Time-Frequency Concentration and ACI Rejection in OFDM-Based Systems. IEEE Transactions on Communications. 2015. vol. 63 (No. 12): 4977-4989.*
Mahmoud and Arslan. Sidelobe Suppression in OFDM-Based Spectrum Sharing Systems Using Adaptive Symbol Transition. IEEE Communications Letters. 2008. vol. 12 (No. 2): 133-135.
Malik et al., Reduction of Out of Band Radiation Using Modified Constellation Expansion in OFDM based Cognitive Radios. International Journal of Computing and Network Technology. 2016. vol. 4 (No. 2): 75-79.
Rathinakumar et al., CPRecycle: Recycling Cyclic Prefix for Versatile Interference Mitigation in OFDM based Wireless Systems. CoNEXT '16.2016. 67-81.

* cited by examiner

*Primary Examiner* — Rhonda L Murphy
(74) *Attorney, Agent, or Firm* — Molly L. Sauter; Smith & Hopen, P.A.

(57) ABSTRACT

A system and method for reducing the OFDM out-of-band emissions (OOBE) by utilizing a transmitter windowing operation that smooths the inherent rectangular pulse shape of the OFDM signals. The technique retains the main design of the OFDM receivers and provides backward compatibility for the existing OFDM-based systems. The guard band and the window parameters that control the guard duration are jointly optimized regarding the use case and the power offset between the users. To fully exploit and further increase the potential of adaptive guards, an interference-based scheduling algorithm is proposed as well.

18 Claims, 12 Drawing Sheets

```
User ID              : 1,  2,   3,   4,   5,   6,   7,   8
Required SIR         : 20, 20,  20,  25,  20,  25,  35,  20    [dB]
Received Power       : 0 , -10, -15, 0 , -5,  -25, -10, -20    [dBm]
Interference Threshold : 30, 25, 15,  35 , 45,  20,  40,  25   [dB]
Total Guard Duration : 22.92 us
Total Guard Band     : 2415 kHz
Efficiency in Freq   : % 86.41
Efficiency in Time   : % 95.88
Efficiency in Spec   : % 82.85
```

```
User ID                : 1 , 2 , 3 , 4 , 5 , 6 , 7 , 8
Required SIR           : 20, 20, 20, 25, 20, 25, 35, 20   [dB]
Received Power         : 0 , -10, -15, 0 , -5, -25, -10, -20  [dBm]
Interference Threshold : 30, 25, 15, 35 , 45, 20, 40, 25   [dB]
Total Guard Duration   : 10.51 us
Total Guard Band       : 1965 kHz
Efficiency in Freq     : % 88.66
Efficiency in Time     : % 98.07
Efficiency in Spec     : % 86.94
```

```
User ID                : 6 , 7 , 8 , 3 , 2 , 5 , 1 , 4
Required SIR           : 25, 35, 20, 20, 20, 20, 20, 25    [dB]
Received Power         :-25, -10, -20, -15, -10, -5,  0,  0    [dBm]
Interference Threshold : 20, 40, 25, 25, 25, 25, 25, 20    [dB]
Total Guard Duration   : 5.34 us
Total Guard Band       : 1455 kHz
Efficiency in Freq     : % 91.35
Efficiency in Time     : % 99.01
Efficiency in Spec     : % 90.44
```

SYSTEM AND METHOD FOR ADAPTIVE OFDM GUARDS

CROSS-REFERENCE TO RELATED APPLICATIONS

This application claims priority to U.S. Provisional Application No. 62/563,935, filed on Sep. 27, 2017, and entitled "SYSTEM AND METHOD FOR ADAPTIVE OFDM GUARD BANDS".

BACKGROUND OF THE INVENTION

The next generation communication systems, including 5G, are expected to support high flexibility and a diverse range of services, unlike the previous standards. The IMT-2020 vision defines the use cases into three main categories including, enhanced mobile broadband (eMBB), massive machine type communications (mMTC), and ultrareliable low-latency communications (URLLC) featuring 20 Gb/s peak data rate, 106/km2 device density, and less than 1 ms latency, respectively. The applications which require larger bandwidth and spectral efficiency fall into the eMBB category, whereas the applications that have a tight requirement for device battery life fall into the mMTC category. Typically, industrial smart sensors and medical implants need to be capable of operating for several years without maintenance, and hence, low device complexity and high energy efficiency are crucial for these mMTC services. Furthermore, the mission-critical applications such as remote surgery or self-driving vehicles are represented in the URLLC category. Therefore, a flexible air interface is required to meet these different requirements.

Orthogonal frequency-division multiplexing (OFDM) is the most popular multi-carrier modulation scheme which is currently being deployed in many standards such as 4G LTE and the IEEE 802.11 family. A major disadvantage of OFDM systems is their high out-of-band emissions (OOBE). The OFDM signal is well localized in the time domain with a rectangular pulse shape, which corresponds to a sinc shape in the frequency domain. The sidelobes of the sincs cause significant OOBE and should be reduced to avoid adjacent channel interference (ACI). In particular, the frequency localization is important to allow asynchronous transmission across adjacent sub-bands and to allow coexistence with other waveforms/numerologies in the network. However, a signal cannot be limited in both domains simultaneously, in accordance with the Heisenberg's uncertainty principle. As such, a better spectrum confinement is realized with the cost of expansion in the time domain.

Commonly, OOBE is reduced by various windowing/filtering approaches and numerous waveforms are proposed for the upcoming 5G standard to provide better time-frequency concentration, with certain trade-offs. These known filtering and windowing operations require an additional period which extends the guard duration between consecutive OFDM symbols. Also, extra guard bands are needed in between adjacent channels to control the adjacent channel interference (ACI) along with the windowing/filtering that handles the OOBE. The forthcoming generations must optimize the guards in both time and frequency domains to boost the spectral efficiency.

Accordingly, what is needed in the art is an improved system and method for reducing the out-of-band emissions (OOBE) of the subcarriers (users) in a OFDM-based communication system.

SUMMARY OF INVENTION

In various embodiments, the present invention provides a system and method for reducing the OFDM out-of-band emissions (OOBE) by utilizing a transmitter windowing operation that smooths the inherent rectangular pulse shape of the OFDM signals. The technique retains the main design of the OFDM receivers and provides backward compatibility for the existing OFDM-based systems. The guard band and the window parameters that control the guard duration are jointly optimized regarding the use case and the power offset between the users. To fully exploit and further increase the potential of adaptive guards, an interference-based scheduling algorithm is proposed as well.

This present invention improves the spectral efficiency of a communication system which supports a variety of services operating asynchronously under the same network.

In one embodiment, the present invention provides a method for improved OFDM signal transmission in a multi-user OFDM communication system. The method includes, identifying a power offset (PO) between a plurality of users operating in adjacent bands of an OFDM-based communication system, identifying a required signal-to-interference ratio (SIR) for the plurality of users. The method further includes, optimizing a guard band for each of the plurality of users based upon the identified power offset the identified required signal-to-interference ratio (SIR) for each of the plurality of users. optimizing a guard duration for each of the plurality of users based upon the identified power offset the identified required signal-to-interference ratio (SIR) for each of the plurality of users and generating an OFDM signal based using the optimized guard bands and optimized guard duration for each of the plurality of users.

Optimizing a guard band for each of the plurality of users based upon the identified power offset the identified required signal-to-interference ratio (SIR) for each of the plurality of users may further include, determining an allowed interference level for each of the plurality of users and maximizing a spectral efficiency of the OFDM signal, wherein the spectral efficiency is maximized when the power offset (PO) of the user combined with the signal-to-interference ratio (SIR) of the user is less than the allowed interference level for the user.

Optimizing a guard duration for each of the plurality of users based upon the identified power offset the identified required signal-to-interference ratio (SIR) for each of the plurality of users may further include, determining an allowed interference level for each of the plurality of users and maximizing a spectral efficiency of the OFDM signal, wherein the spectral efficiency is maximized when the power offset (PO) of the user combined with the signal-to-interference ratio (SIR) of the user is less than the allowed interference level for the user.

A windowing function may be performed on the signal for each of the plurality of users based upon the optimized guard band and optimized guard duration.

The method may further include, performing interference-based scheduling for each of the plurality of users prior to generating the OFDM signal, wherein performing interference-based scheduling for each of the plurality of users may further include grouping users with similar received power levels and similar signal-to-interference ratios (SR) adjacent to each other.

In an additional embodiment, the present invention provides an apparatus comprising one or more integrated circuit devices which may be configured to receive a data symbol vector comprising data mapped to a subcarrier associated with one of a plurality of users operating in adjacent bands of an OFDM-based communication system, identify a power offset (PO) between the plurality of users operating in adjacent bands of the OFDM-based communication system, identify a required signal-to-interference ratio (SIR) for the plurality of users, optimize a guard band for each of the plurality of users based upon the identified power offset the identified required signal-to-interference ratio (SIR) for each of the plurality of users, optimize a guard duration for each of the plurality of users based upon the identified power offset the identified required signal-to-interference ratio (SIR) for each of the plurality of users and generate an OFDM signal based using the optimized guard bands and optimized guard duration for each of the plurality of users.

The one or more integrated circuit devices of the apparatus may further be configured to perform interference-based scheduling for each of the plurality of users prior to generating the OFDM signal.

In another embodiment, the present invention provides a non-transitory computer readable storage medium having computer program instructions stored thereon that, when executed by one or more processors, cause the one or more processors to perform a method of generating an orthogonal frequency division multiplexing (OFDM) symbol for transmission in a communication channel using adaptive guard bands and adaptive guard durations. The method performed may include, receiving a data symbol vector comprising data of a plurality of users operating in adjacent bands of an OFDM-based communication system, identifying a power offset (PO) between the plurality of users operating in the adjacent bands of the OFDM-based communication system, identifying a required signal-to-interference ratio (SIR) for each of the plurality of users, optimizing a guard band for each of the plurality of users based upon the identified power offset the identified required signal-to-interference ratio (SIR) for each of the plurality of users, optimizing a guard duration for each of the plurality of users based upon the identified power offset the identified required signal-to-interference ratio (SIR) for each of the plurality of users and generating a first OFDM signal based using the optimized guard bands and optimized guard duration for each of the plurality of users.

The method implemented by the non-transitory computer readable storage medium may further include, grouping users with similar received power levels and similar signal-to-interference ratios (SR) adjacent to each other to improve the spectral efficiency of the transmission.

Accordingly, the present invention provides an improved system and method for reducing the out-of-band emissions (OOBE) of the subcarriers (users) in a OFDM-based communication system utilizing adaptive guard bands and guard duration, and interference-based scheduling.

In various embodiments, the present invention illustrates the significance of adaptive guards considering a windowed-OFDM system which supports a variety of services operating asynchronously under the same network. The windowing approach of the present invention requires a guard duration to suppress the out-of-band emissions (OOBE), and a guard band is required to handle the adjacent channel interference (ACI), along with the windowing. The guards in both time and frequency domains are optimized with respect to the use case and power offset between the users. To fully exploit and further increase the potential of adaptive guards, an interference-based scheduling algorithm is proposed as well.

The results show that the precise design that facilitates such flexibility reduce the guards significantly and boost the spectral efficiency.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention addresses the significance of adaptive guards considering an OFDM-based system which supports a variety of services operating asynchronously under the same network.

In the present invention, the out-of-bound emission (OOBE) of the OFDM signal is reduced with a transmitter windowing operation that smooths the inherent rectangular pulse shape of the OFDM signals. This technique retains the main design of the OFDM receivers and provides backward compatibility for the existing OFDM-based systems. The guard band and the window parameters that control the guard duration are jointly optimized regarding the use case and the power offset between the users.

Although various windowing approaches have previously been proposed to provide better spectral concentration, the present invention also reduces the need for guards by grouping the users with similar power levels and similar signal-to-interference ratio (SIR) requirements. Hence, the potential of adaptive guards is further increased and exploited with an interference-based scheduling algorithm.

In a multiuser OFDM-based system, asynchronous numerologies operate in the network. The users of the multiuser OFDM-based system, which have different use cases (i.e., requirements) and power levels, perform transmitter windowing to control their OOBE levels and to reduce interference to the users serving in adjacent bands. The guard duration that is designated for the multi-path channel is fixed and is sufficient to handle the inter-symbol interference (ISI). An additional guard duration is required to perform windowing.

Several windowing functions have been evaluated in the art, in detail with different tradeoffs between the width of the main lobe and suppression of the side lobes. The optimal windowing function is beyond the scope of this description, and in the present invention, the raised-cosine (RC) window is adopted due to its computational simplicity and common use in the art.

Figure 1:
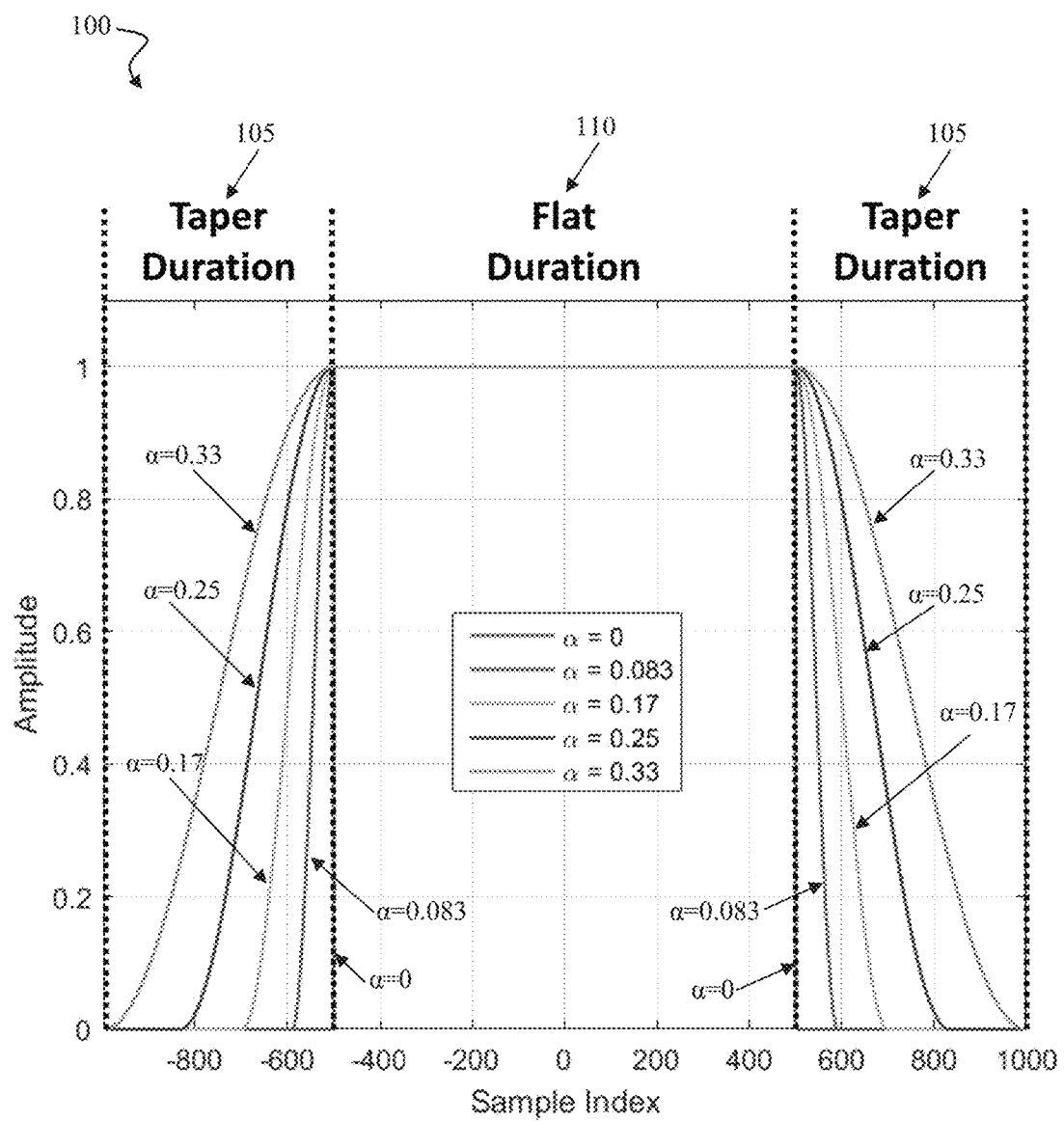
FIG. 1 is a graphical illustration of OFDM raised-cosine (RC) windowing, with various roll-off factors, in accordance with an embodiment of the present invention.

The RC window function is expressed as follows:

$$g[n] = \begin{cases} \frac{1}{2} + \frac{1}{2}\cos\left(\pi + \frac{\pi n}{\alpha N_T}\right) & 0 \le n \le \alpha N_T \\ 1 & \alpha N_T \le n \le N_T \\ \frac{1}{2} + \frac{1}{2}\cos\left(\pi 1 + \frac{\pi n}{\alpha N_T}\right) & N_T \le n \le (\alpha+1)N_T \end{cases} \quad (1)$$

where $\alpha$ is the roll-off factor $0 \le n \le \alpha N_T$ and $N_T$ is the symbol length of the RC function. The roll-off factor ($\alpha$) controls the taper duration of the window. As $\alpha$ increases, the OOBE decreases at the price of increased guard duration to perform windowing. The RC windowing function 100 is illustrated in FIG. 1, with varying roll-off factors, wherein $\alpha N_T$ is the taper duration 105 and $(\alpha+1)N_T$ is the flat duration 110. The taper duration 105 (i.e. guard duration) increases as $\alpha$ increases.

Figure 2:
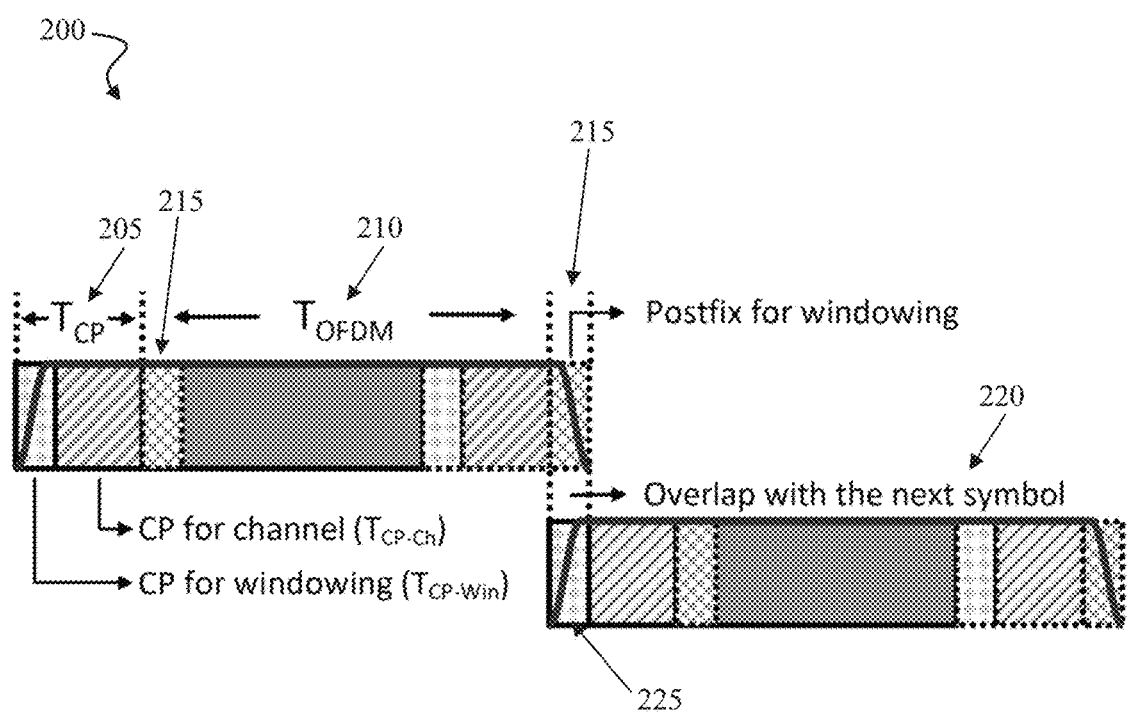
FIG. 2 is an illustration of the transmitter windowing operation and the guard durations, in accordance with an embodiment of the present invention.

The transmitter windowing operation 200 is illustrated in FIG. 2. First, the cyclic prefix (CP) 205 that is allocated to deal with the multipath channel is further extended on both edges of the OFDM symbol 210, and then the extended portion 215 from the beginning of the OFDM symbol 210 is appended to the end of the symbol 210. The transition portion 215 of the first symbol 210 and the transition portion 225 (i.e., ramp-ups and ramp-downs) of adjacent symbols 220 are overlapped to decrease the additional time-domain overhead resulting from the windowing operation 200.

Figure 3:
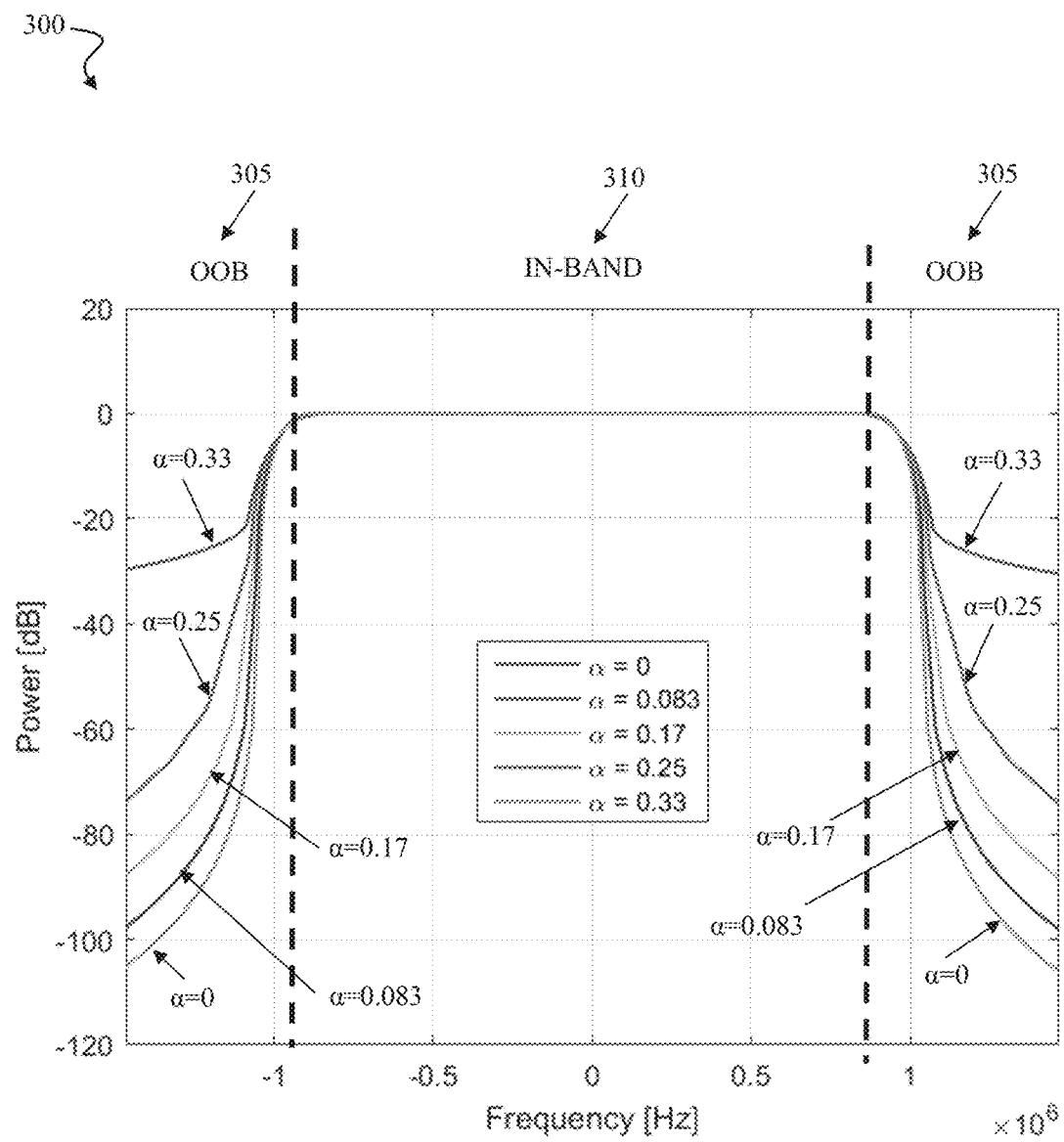
FIG. 3 is an illustration of the guard band allocation considering the interference threshold ($\theta$) in the adjacent band, in accordance with an embodiment of the present invention, wherein OBW stands for occupied bandwidth and $\theta$ is represented in dB w.r.t. the power of "user A" throughout the description.

FIG. 3 illustrates the OOBE suppression utilizing an RC window. In this exemplary embodiment, N=128, $\Delta f$=−15 kHz, there are 100 CP-OFDM symbols and the window type is raised cosine. In this embodiment, the OOBE level of the OFDM is controlled by windowing and the taper (i.e. guard) durations are overlapped. As shown, the OOBE level and the required guard band decreases as the roll-off factor ($\alpha$) increases.

However, the windowing operation 200 is not sufficient to handle the OOBE, and non-negligible guard bands are still needed. However, the amount of guard band or the length of guard duration to perform windowing depends on the power offset and the required signal-to-interference ratio (SIR) level of the users in adjacent bands. As an example, the leaked energy from the near user can be more powerful than the in-band energy of the far user in its adjacent band (i.e., the well-known near-far problem). The power control mechanism is one solution for this power offset problem. However, it prevents near users from deploying higher order modulation schemes. Thus, the power control needs to be relaxed with an adaptive design to improve the spectral efficiency.

The required guards in both time and frequency domains are tightly related to the use case as well. For example, the guard units and other extra overhead decreases the spectral efficiency, which is especially critical for the eMBB type of communications. Hence, the guards are reduced at the expense of interference on the adjacent bands. On the other hand, the reliability and latency are extremely important for mission critical communications where errors and retransmissions are less tolerable. Thus, a strict OOBE suppression is more feasible for URLLC applications. In addition, mMTC operates at a low power level to preserve energy and may seriously suffer from the adjacent channel interference (ACI) in an asynchronous heterogeneous network. Accordingly, to improve OFDM transmission technology, the present invention adapts the threshold for the allowed interference level ($\theta$) on adjacent bands by taking into consideration the power offset (PO) and the use case.

Figure 4:
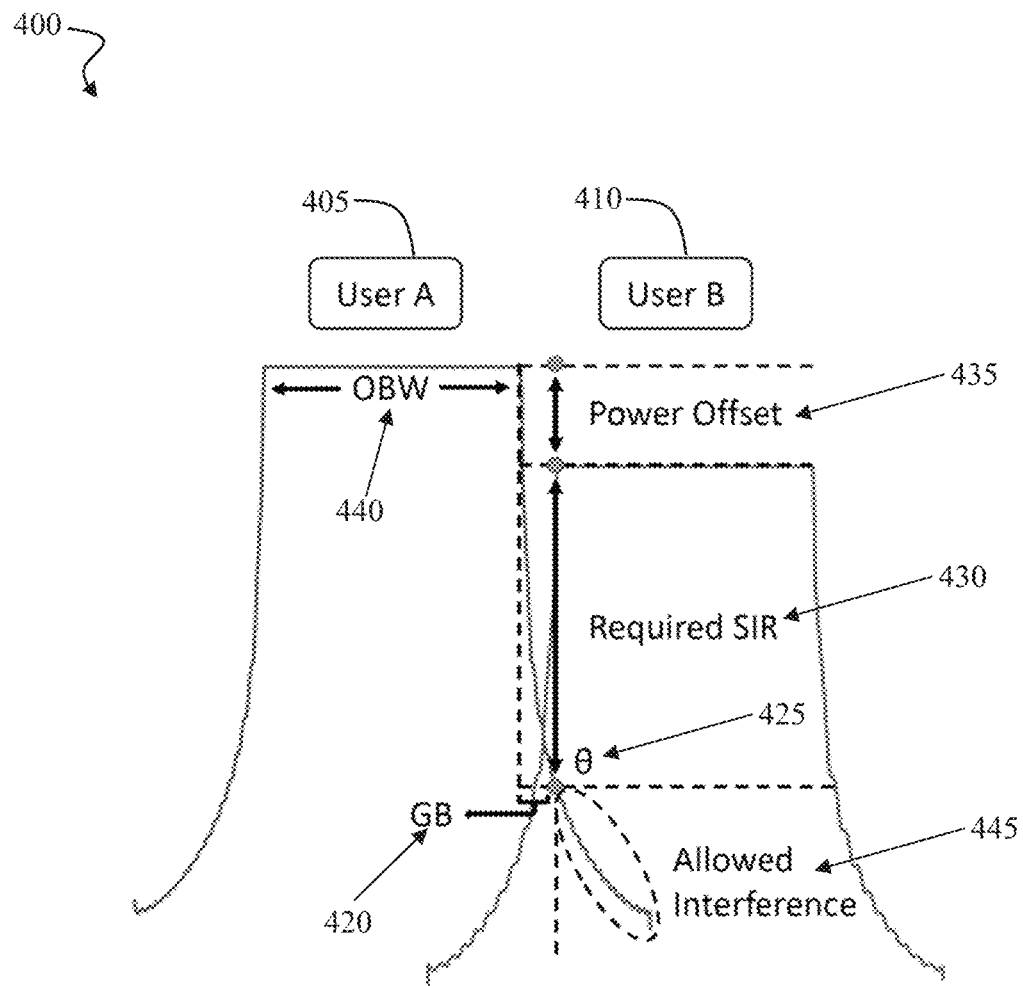
FIG. 4 is a graphical illustration of OFDM raised-cosine (RC) windowing considering the guard band allocation illustrated in FIG. 3.

FIG. 4 illustrates the guard allocation 400, in accordance with the present invention. More specifically, FIG. 4 illustrates how the guard band (GB) 420 is inserted between user A 405 and user B 410, considering the interference level ($\theta$) 425 to achieve the desired signal-to-interference (SIR) level 430 when there is a power offset (PO) 435 between the users 405, 410 in adjacent bands. In an exemplary embodiment, throughout the numerical evaluations, $T_{CP\text{-}Win}$ (i.e., guard duration (GD)) and the guard band (GB) are adaptive, and these guards are optimized as described below. The remainder of the parameters belonging to the windowed-OFDM (W-OFDM) system are fixed and summarized in Table I.

TABLE I

| SIMULATION PARAMETERS | |
| --- | --- |
| Parameter | Value |
| FFT Size | 1024 |
| $CP_{channel}$ Size | 256 |
| Subcarrier Spacing ($\Delta f$) | 15 kHz |
| Occupied Bandwidth (OBW) | 15.36 MHz |
| $T_{OFDM}$ | 66.7 µs |
| $T_{CP\text{-}channel}$ | 16.68 µs |
| # OFDM Symbols | 300 |
| Window Type | Raised Cosine |

In the present invention, the adjacent channel interference (ACI) is handled by windowing and allocating guard band between adjacent users as previously described. Since the windowing operation suppresses the OOBE, with a penalty of increased guard duration, the procedure converges to the utilization of guard duration (GD) and guard band (GB) to achieve the desired interference threshold ($\theta$).

In accordance with the present invention, with the adjacent users 405, 410 occupying a specific bandwidth (OBW) 420, the allowed interference level 445 is controlled by with the interference threshold ($\theta$) 425. The guard band (GB) 420 and the guard duration (GD) are then optimized to maximize the spectral efficiency ($\eta_{spec}$) as follows:

$$(GB, GD) = \arg\max_{GB, GD}(\eta_{spec}) \quad (2)$$

Subject to: $PO + SIR \leq \theta$

Accordingly, the guard band (GB) and the guard duration (GD) are optimized to maximize the spectral efficiency of the channel, such that the sum of the power offset (PO) between users in adjacent bands and the required signal-to-interference ratio (SIR) of the users is not greater than the interference threshold θ.

Figure 5:
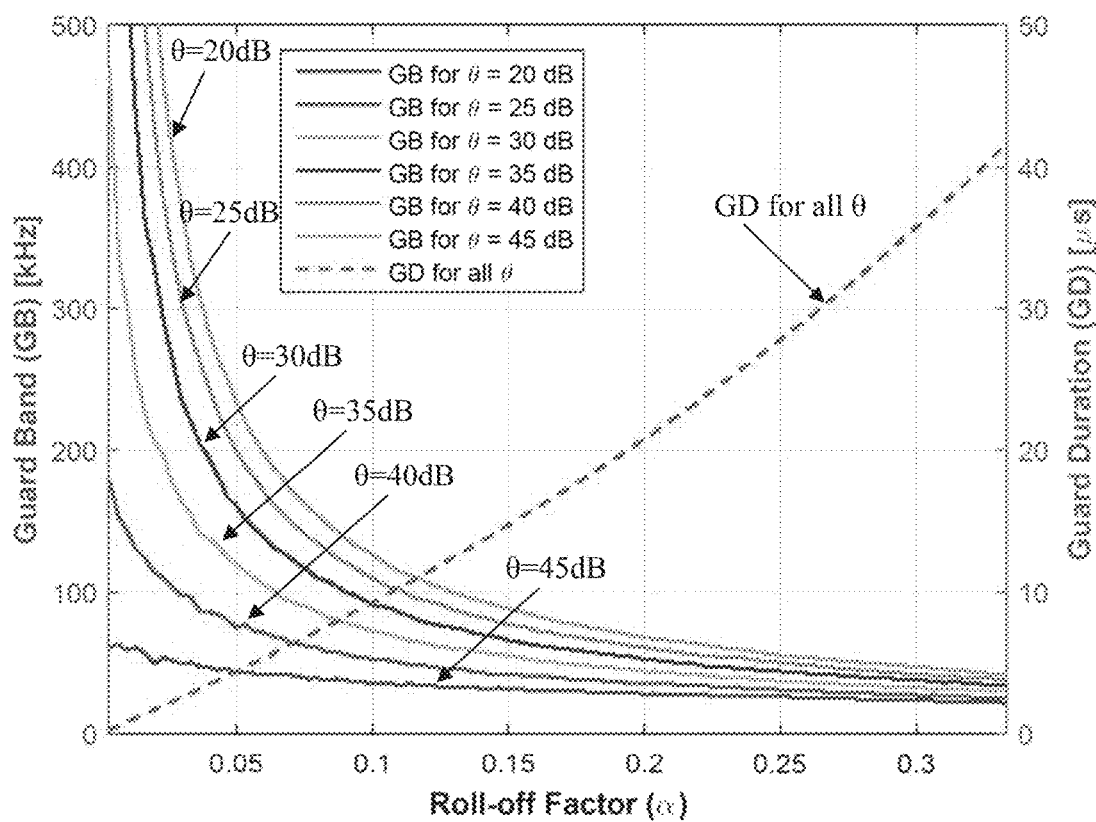
FIG. 5 is a graphical illustration of the required guard band (GB) and guard duration (GD) to achieve selected interference threshold ($\theta$) levels, in accordance with an embodiment of the present invention.

FIG. 5 presents the required GB and GD for selected θ (interference thresholds). Each α value in the figure corresponds to a GD to perform windowing and a GB to address the remaining interference power for a given θ. An excessive amount of resources is needed to solve the problem only with GB or GD. As a result, the spectral efficiency, which is defined as the information rate that can be transmitted over a given bandwidth, decreases significantly. Therefore, GB and GD must be jointly optimized to boost the efficiency of the communication system. It is known to perform a hyper-parameter optimization by a grid search algorithm through a manually specified subset of the hyper-parameter space. The spectral efficiency ($\eta_{spec}$) is proportional to the multiplication of efficiencies in the time and frequency domains which are expressed as follows:

$$n_{time} = \frac{T_{OFDM}}{T_{OFDM} + T_{CP-Ch} + T_{CP-Win}} \quad (3)$$

$$n_{freq} = \frac{OBW}{OBW + (GB \times 2)} \quad (4)$$

Since $T_{OFDM}$, $T_{CP-Ch}$ and OBW are fixed parameters, the degrees of freedom that can be selected independently become only $T_{CP-Win}$ (i.e., GB) and GD. The problem that seeks for the optimal GB and GD pair can be formulated as follows:

$$(GB, GD) = \arg\max_{GB, GD}(\eta_{time} \times \eta_{freq}), \quad (5)$$

subject to: $PO + SIR \leq \theta$. (6)

Figure 6:
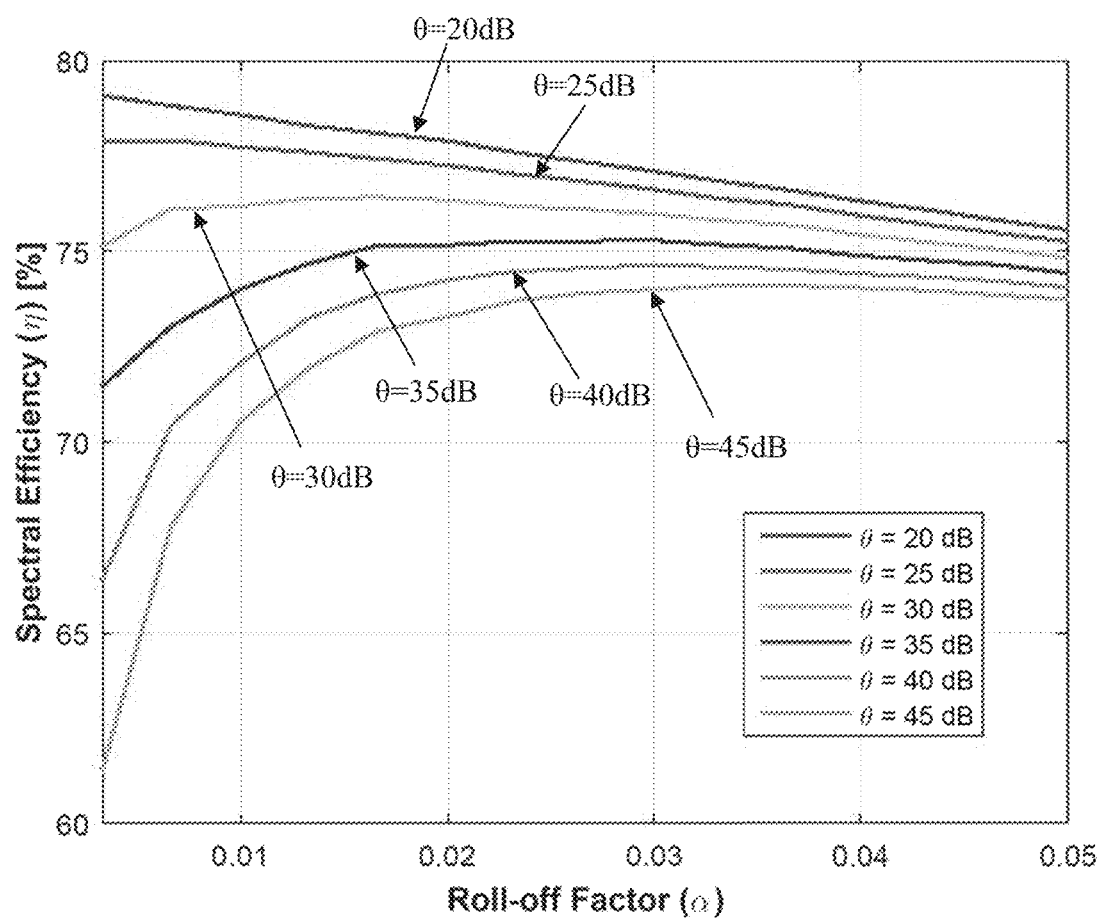
FIG. 6 is a graphical illustration of the spectral efficiency ($\eta$) of the GB and GD pairs that achieve selected $\theta$, wherein each $\alpha$ corresponds to a GB-GD pair, as shown in FIG. 5.

The spectral efficiency of the W-OFDM system for selected θ values is presented in FIG. 6. Each α value in the graph corresponds to a GB-GD pair for a given θ and the peak value of each curve provides the optimal pair. These optimal pairs are listed in Table II along with the associated parameters. The results show that the need for windowing decreases as θ decreases, and hence the desired ACI level can be achieved with only a few guard carriers. In addition, the spectral efficiency increases with the decrease in θ. The variation in required guards clearly affirms that the adaptive design improves the spectral efficiency significantly instead of designing the system considering the worst case (e.g., $\eta_{\theta=45\ dB}$=74.11% whereas $\eta_{\theta=20\ dB}$=79.33%).

TABLE II

THE OPTIMAL GUARDS FOR SELECTED θ

| OOBE Threshold (θ) [dB] | Max. Spectral Efficiency (η) [%] | Roll-off Factor (α) | Required Guard Duration [μs] | Required Guard Band [kHz] | Required Guard Carriers |
|---|---|---|---|---|---|
| 20 | 79.33 | 0.0000 | 0.00 | 64.48 | 5 |
| 25 | 77.92 | 0.0067 | 0.55 | 153.06 | 11 |
| 30 | 76.43 | 0.0167 | 1.40 | 226.07 | 16 |
| 35 | 75.30 | 0.0300 | 2.57 | 235.51 | 16 |
| 40 | 74.65 | 0.0300 | 2.57 | 303.95 | 21 |
| 45 | 74.11 | 0.0333 | 2.86 | 333.96 | 23 |

The optimization results previously described reveal that the spectral efficiency (η) decreases as the interference threshold (θ) increases. Since θ depends on the users operating in the adjacent bands, the potential of adaptive guards can be increased further along with the utilization of an interference-based scheduling algorithm. Assuming that the base station or the user equipment has all the necessary information, θ is determined as follows:

$$\theta_i = \max(SIR_{i-1}+PO_{i-1}, SIR_{i+1}+PO_{i+1}), \forall i \quad (7)$$

where i is the indicator of the available consecutive bands. If the users with similar power levels and SIR requirements are grouped together, the average θ in the network decreases. As a result, the need for guards is reduced, and the spectral efficiency is increased.

Figure 7:
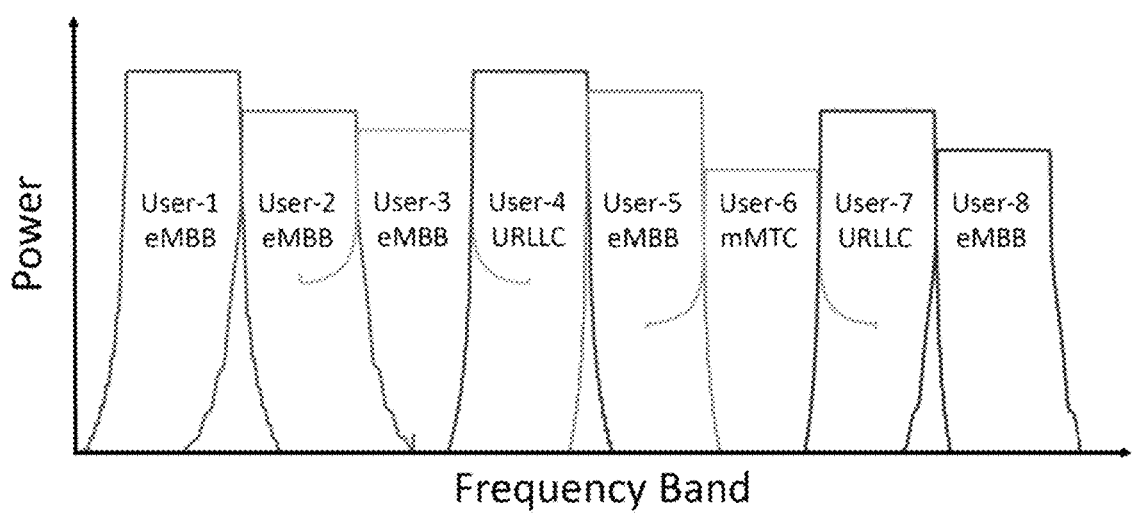
FIG. 7 is an illustration of random scheduling for eight users which have different requirements, as is known in the prior art.
Figure 8:
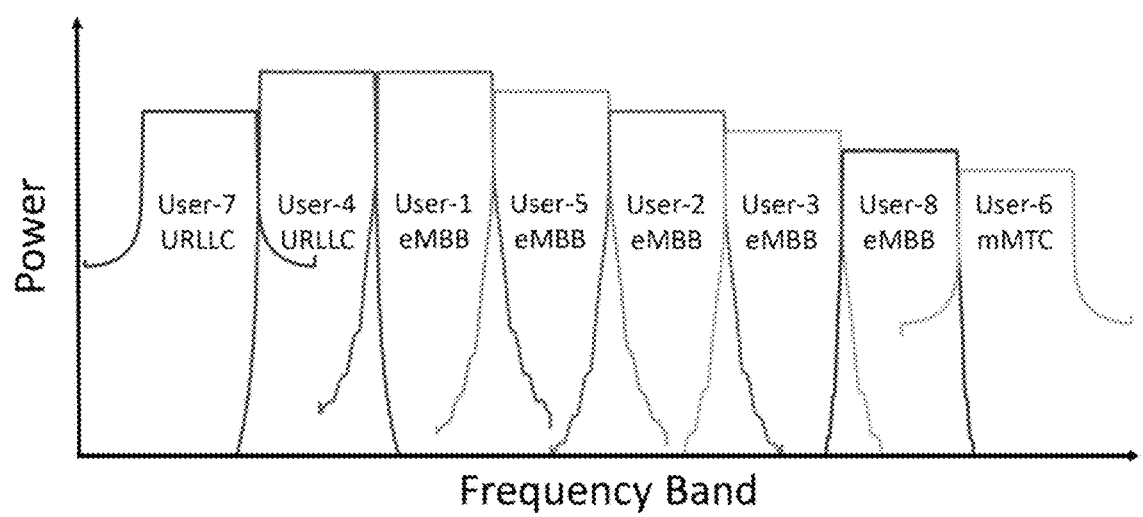
FIG. 8 is an illustration of interference-based (intelligent) scheduling of eight users which have different requirements, in accordance with an embodiment of the present invention.

Consider an exemplary scenario with eight users, where the users have different power levels and SIR requirements as shown in Tables III and IV. The power offset (PO) pairs in the tables are provided regarding the users in adjacent bands. The users are assigned to the bands in two different ways. In the first scenario, a random scheduling has been realized, as shown in FIG. 7, whereas the adjacent channel interference (ACI) based scheduling strategy is utilized in the second scenario, as shown in FIG. 8.

To compare and present the impact of the adaptive guards provided by the present invention, a fixed guard assignment strategy is implemented in the random scheduling scenario as well. The guards are selected regarding the worst-case scenario (i.e., θ=45 dB) in the fixed assignment scenario. The comparison of required guards for the fixed guard assignment with random scheduling, the adaptive guard assignment with random scheduling, and the adaptive guard assignment with intelligent interference-based scheduling scenarios is summarized in Table V. The results show that the amount of guard duration (GD) and guard band (GB) decreased by 57% and 19%, respectively when the fixed guards are replaced with the adaptive guards. In addition, the amount of GD and GB decreased further by 35% and 16%, respectively when the random scheduling is replaced with the interference-based scheduling strategy of the present invention.

TABLE III

THE REQUIREMENTS OF RANDOMLY SCHEDULED USERS

| Band | 1 | 2 | 3 | 4 | 5 | 6 | 7 | 8 |
|---|---|---|---|---|---|---|---|---|
| User | 1 | 2 | 3 | 4 | 5 | 6 | 7 | 8 |
| Req. SIR [dB] | 20 | 20 | 20 | 25 | 20 | 25 | 35 | 20 |
| Rx Power [dBm] | 0 | −10 | −15 | 0 | −5 | −25 | −10 | −20 |

TABLE III-continued

THE REQUIREMENTS OF RANDOMLY SCHEDULED USERS

| Band | 1 | 2 | 3 | 4 | 5 | 6 | 7 | 8 |
|---|---|---|---|---|---|---|---|---|
| Power Offset [dB] | 10 | −10, 5 | −5, −15 | 15, 5 | −5, 20 | −20, −15 | 15, 10 | −10 |
| Intf. Thr. (θ) [dB] | 30 | 25 | 15 | 35 | 45 | 20 | 40 | 25 |

TABLE IV

THE REQUIREMENTS OF INTERFERECE-BASED SCHEDULED USERS

| Band | 1 | 2 | 3 | 4 | 5 | 6 | 7 | 8 |
|---|---|---|---|---|---|---|---|---|
| User | 7 | 4 | 1 | 5 | 2 | 3 | 8 | 6 |
| Req. SIR [dB] | 35 | 25 | 20 | 20 | 20 | 20 | 20 | 25 |
| Rx Power [dBm] | −10 | 0 | −5 | −10 | −15 | −20 | −25 | −25 |
| Power Offset [dB] | −10 | 10, 0 | 0, 5 | −5, 5 | −5, 5 | −5, 5 | −5, 5 | −5 |
| Intf. Thr. (θ) [dB] | 15 | 45 | 25 | 25 | 25 | 25 | 30 | 15 |

TABLE V

THE COMPARISON OF REQUIRED GUARDS FOR DIFFERENT SCENARIOS

| Scenario | Required Guard Duration [μs] | Required Guard Band [kHz] |
|---|---|---|
| Fixed Guards Random Scheduling | 22.88 | 2337 |
| Adaptive Guards Random Scheduling | 9.95 | 1891 |
| Adaptive Guards Intf-based Scheduling | 6.46 | 1579 |

Figure 9:
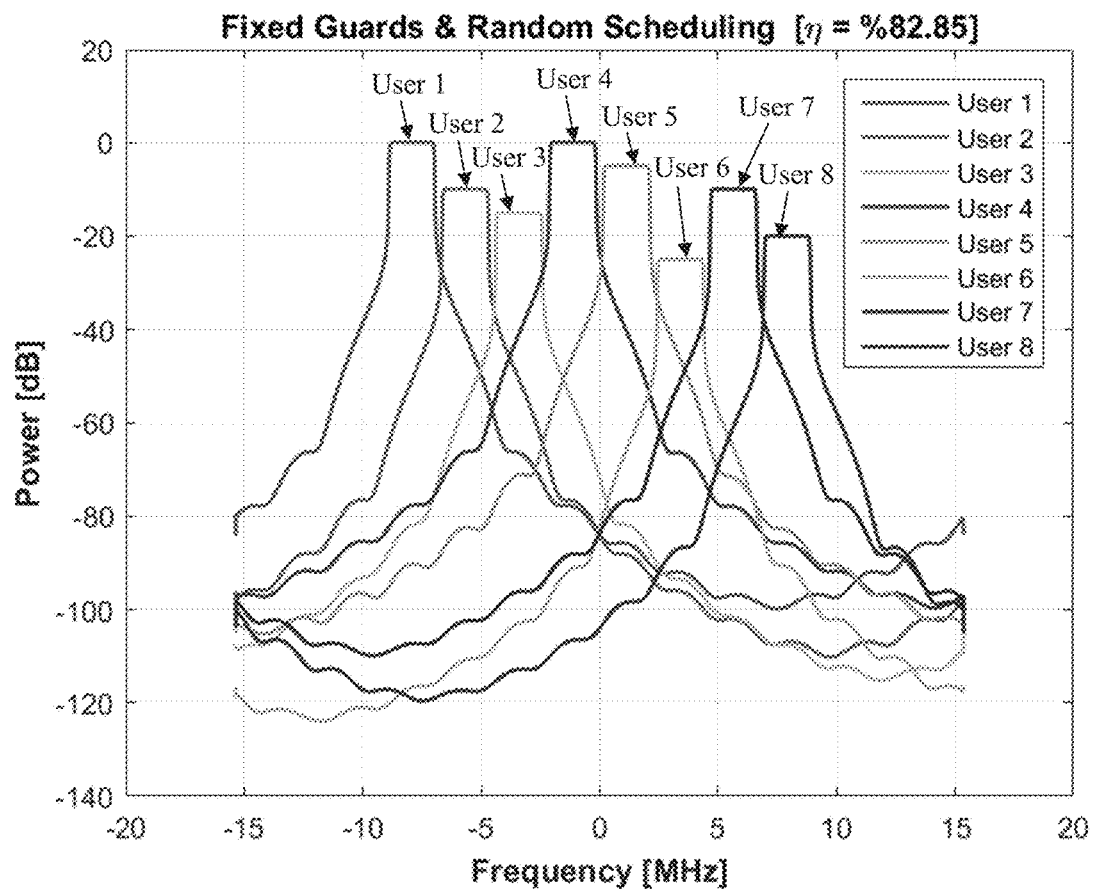
FIG. 9 is an illustration of the resource allocation in a frequency flat channel for a plurality of users utilizing fixed guards and random scheduling.
Figure 10:
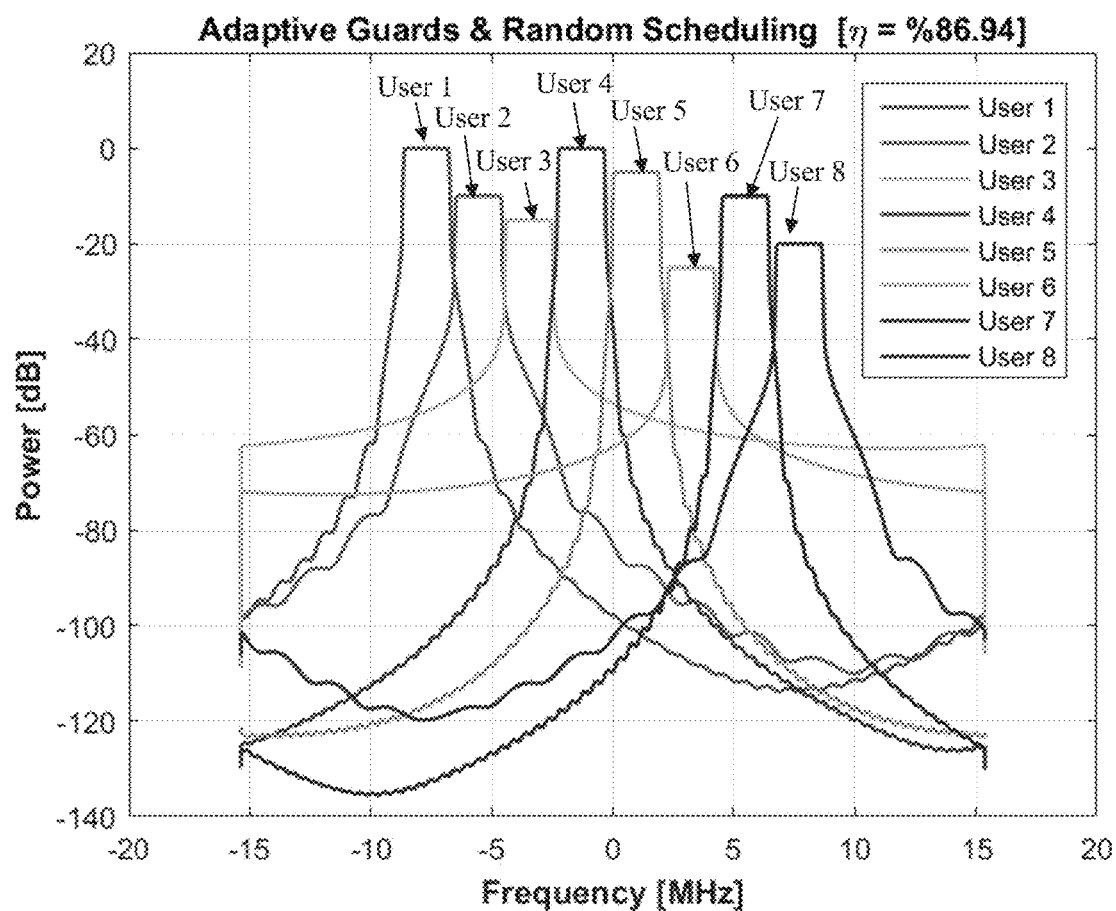
FIG. 10 is an illustration of the resource allocation in a frequency flat channel for a plurality of users utilizing adaptive guards and random scheduling, in accordance with an embodiment of the present invention.
Figure 11:
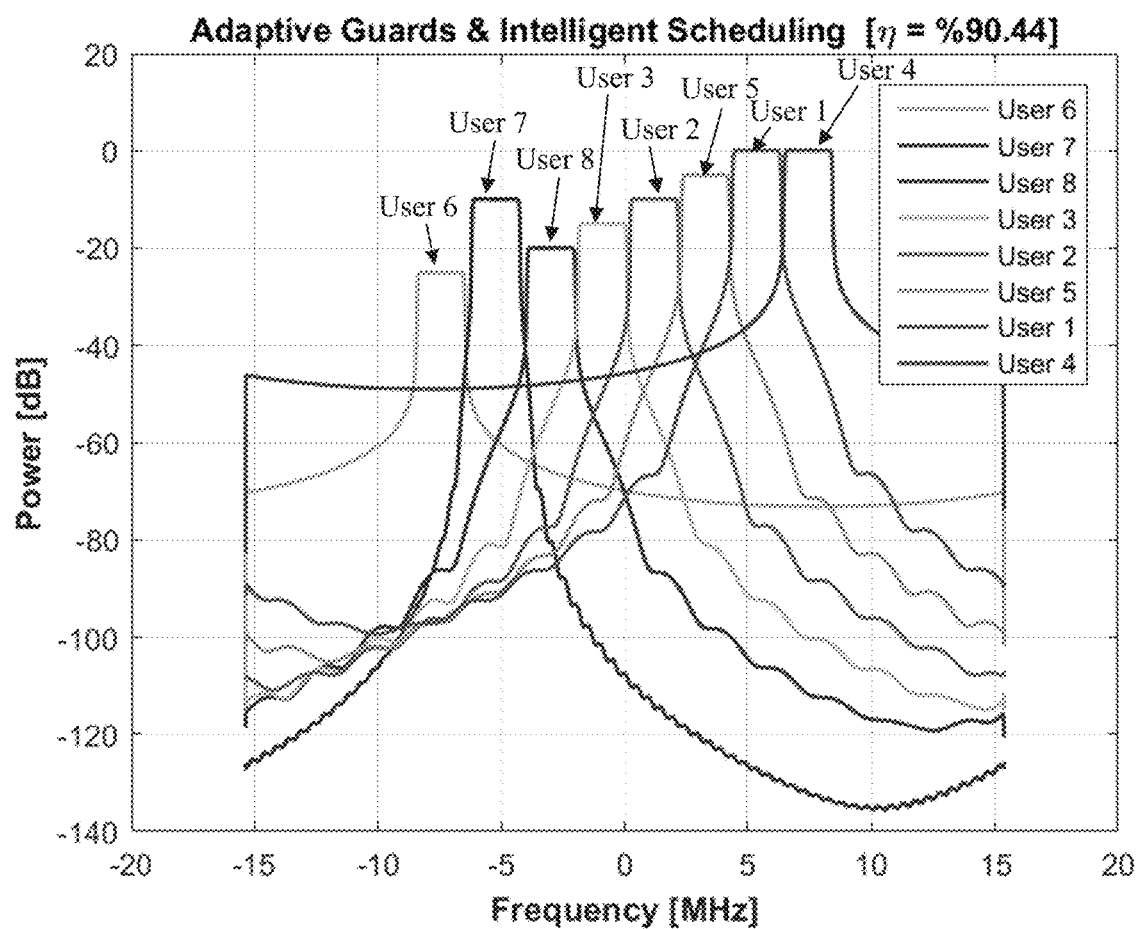
FIG. 11 is an illustration of the resource allocation in a frequency flat channel for a plurality of users utilizing adaptive guards and intelligent scheduling, in accordance with an embodiment of the present invention.

In an additional exemplary embodiment for resource allocation (RA) in a frequency flat channel including N=8 users, the number of all possible arrangements of users is N!. FIG. 9 illustrates the resource allocation results utilizing the standard fixed guards and random scheduling, which results in a spectral efficiency of 82.85%. FIG. 10 illustrates the resource allocation results utilizing the adaptive guards, in accordance with an embodiment of the present invention and random scheduling, which results in an improved spectral efficiency of 86.94%. FIG. 11 illustrates the resource allocation results utilizing the adaptive guard band and intelligent scheduling, in accordance with an embodiment of the present invention, which results in an even more improved spectral efficiency of 90.44%. As such, it is shown that the spectral efficiency of the network can be improved using adaptive guards and can be further improved using adaptive guards in combination with intelligent scheduling. As such, the maximum spectral efficiency is obtained when similar users are grouped together.

A comparison of the required guards for the fixed guard assignment with random scheduling, the adaptive guard assignment with random scheduling and the adaptive guard assignment with intelligent interference-based scheduling scenarios, as shown in FIG. 9, FIG. 10 and FIG. 11, respectively, shows that the guard duration (GD) decreased from 22.92 μs to 10.51 μs and the guard band (GB) decreased from 2415 kHz to 1965 kHz, when the adaptive guard method of the present invention was implemented. In addition, the GD decreased to 5.34 μs and the GB decreased to 1455 kHz when both the inventive adaptive guard method and intelligent scheduling were implemented.

In an exemplary embodiment for performing the intelligent scheduling in accordance with the present invention, since the interference threshold of each user ($\theta_i$) is equal to the received power of the user ($P_i$) minus the received power of an adjacent user ($P_j$) plus the required signal-to-noise ratio of the adjacent user (SIR), then:

$$\theta_i = P_i - P_j + SIR_j \quad (8)$$

Hence, a similarity metric can be defined using this relationship by calculating:

$$\beta_j = SIR_j - P_j \quad (9)$$

for all users and sorting the similarity metric (β) in as ascending or descending order. Using the user specific data from FIG. 9-FIG. 11, results in the following order for the users, as shown in FIG. 11.

| User ID: | 6 | 7 | 8 | 3 | 2 | 4 | 5 | 1 |
|---|---|---|---|---|---|---|---|---|
| SIR: | 25 | 25 | 35 | 20 | 20 | 25 | 20 | 20 |
| P: | −25 | −10 | −20 | −15 | −10 | 0 | −5 | 0 |
| β: | 50 | 45 | 40 | 35 | 30 | 25 | 25 | 20 |

If the β values repeat for any of the users, those users are then sorted based upon the received power (P) in the adjacent band. As such, as shown in the list above, the order of user 4 and user 5 would be switched to follow this sorting rule. Additionally, the received power (P) is checked on both sides of the user and if the received power (P) is the same as the user in the adjacent band, the user with the higher SIR is place to the frame edge. As such, the order of user 1 and user 4 would be switched to following this sorting rule. As a result, the algorithm reaches the best arrangement (i.e. 6, 7, 8, 3, 2, 5, 1, 4 in this example, which having to check N! user arrangements.

This sorting methodology is exemplary in nature and various other methods to provide sorting for intelligent scheduling are within the scope of the present invention.

Figure 12:
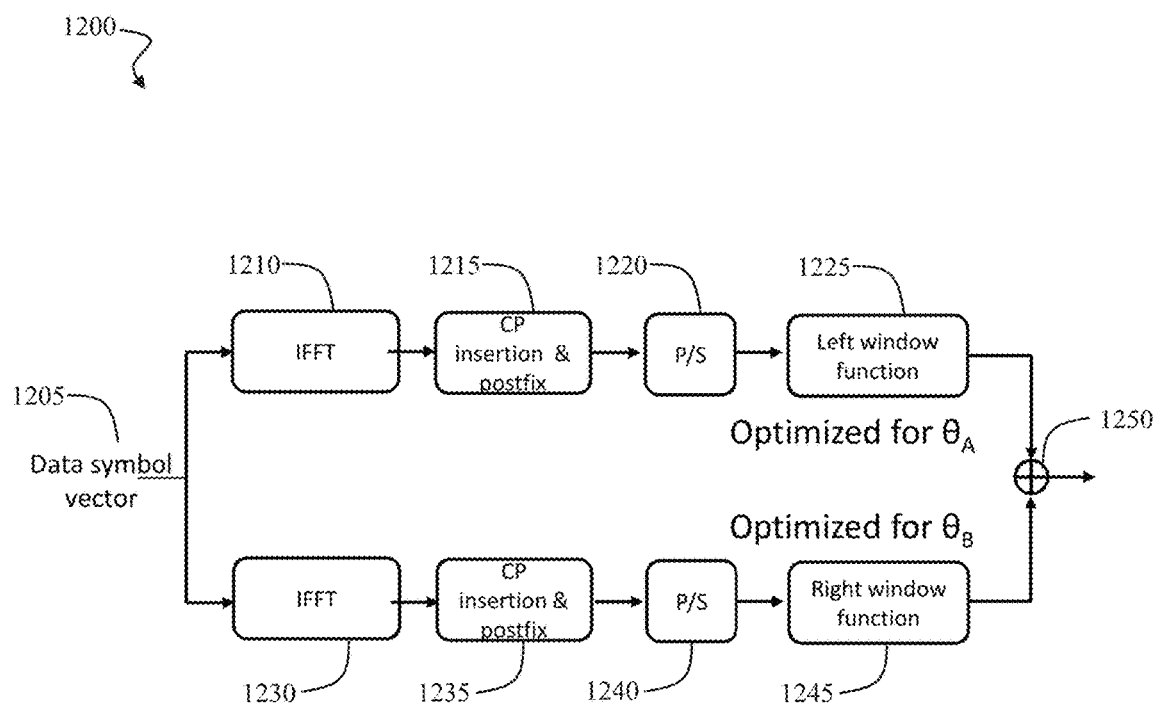
FIG. 12 is a block diagram illustrating the hardware elements of a system for implementing adaptive guard bands and intelligent scheduling, in accordance with an embodiment of the present invention.

FIG. 12 illustrates an exemplary system 1200 for generating an OFDM symbol comprising a plurality of OFDM subcarriers, wherein the guard band and guard duration of each of the plurality of OFDM subcarriers are optimized to maximize the efficiency of the communication channel, in accordance with the present invention. The system may include circuitry for optimizing the guard band and the guard duration of a subcarrier from a received data symbol vector 1205 based upon the required signal-to-interference ratio of the subcarrier and a power offset between adjacent subcarriers. The circuitry for performing optimization of the guard band and guard duration of the left windowing function for the subcarrier may include circuitry for performing an Inverse Fast Fourier Transform (IFFT) 1210 of the received data symbol vector 1205 to generate a time domain signal, circuitry for applying a first cyclic prefix (CP) insertion and postfix 1215 to the time domain signal, circuitry for converting the time domain signal from parallel to serial data 1220 and circuitry for optimizing the guard band and guard duration of the left windowing function to optimize the allowed interference level relative to the adjacent subcarrier to the left of the subcarrier of interest 1225. The circuitry for performing optimization of the guard band and guard duration of the right windowing function for the subcarrier may include circuitry for performing an Inverse Fast Fourier Transform (IFFT) 1230 of the received data symbol vector 1205 to generate a time domain signal, circuitry for applying a first cyclic prefix (CP) insertion and postfix 1235 to the time domain signal, circuitry for converting the time domain signal from parallel to serial data 1240 and circuitry for optimizing the guard band and guard duration of the left windowing function to optimize the allowed interference level relative to the adjacent subcarrier to the left of the subcarrier of interest 1245. The system further includes circuitry for combining the subcarriers 1250 to generate the OFDM symbol 1255. In one embodiment, the system of the present invention may be implemented in an OFDM transmitter.

In the present invention, the importance of adaptive guards considering a windowed-OFDM system which supports a variety of services operating asynchronously under the same network is described. In various embodiments, the guards in both time and frequency domains are optimized taking the use case and power offset into account. Furthermore, the need for guards is reduced with an interference-based scheduling algorithm. Such a scheduling strategy is especially critical when the power offset between the users operating in adjacent bands is high.

The results show that the precise design that facilitates such flexibility considering the user requirements significantly improves the spectral efficiency. Although the computational complexity increases compared to conventional OFDM-based systems, the computation of the optimal GB and GD is an offline process that requires a one-time solution. Hence, a lookup table method can be adopted to reduce the complexity.

The results of the present invention may be extended by optimizing the guards and scheduling the users under various channel conditions and impairments. Also, the proposed methodology is applicable to the filtered-OFDM systems. The next generation communications systems are evolving towards an increased flexibility in different aspects. Enhanced flexibility is the key to addressing diverse requirements of new network environments and the guards should be a part of the flexibility consideration, as well.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java. C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for improved OFDM signal transmission in a multi-user OFDM communication system, the method comprising:
   identifying a power offset (PO) between a plurality of users operating in adjacent bands of an OFDM-based communication system;
   identifying a required signal-to-interference ratio (SIR) for the plurality of users;
   optimizing a guard band for each of the plurality of users based upon the identified power offset and the identified required signal-to-interference ratio (SIR) for each of the plurality of users;
   optimizing a guard duration for each of the plurality of users based upon the identified power offset and the identified required signal-to-interference ratio (SIR) for each of the plurality of users; and
   generating an OFDM signal using the optimized guard bands and the optimized guard duration for each of the plurality of users.

2. The method of claim 1, wherein optimizing a guard band for each of the plurality of users based upon the identified power offset and the identified required signal-to-interference ratio (SIR) for each of the plurality of users further comprises:
   determining an allowed interference level for each of the plurality of users; and
   maximizing a spectral efficiency of the OFDM signal, wherein the spectral efficiency is maximized when the power offset (PO) of the user combined with the signal-to-interference ratio (SIR) of the user is less than the allowed interference level for the user.

3. The method of claim 1, wherein optimizing a guard duration for each of the plurality of users based upon the identified power offset and the identified required signal-to-interference ratio (SIR) for each of the plurality of users further comprises:
   determining an allowed interference level for each of the plurality of users; and
   maximizing a spectral efficiency of the OFDM signal, wherein the spectral efficiency is maximized when the power offset (PO) of the user combined with the signal-to-interference ratio (SIR) of the user is less than the allowed interference level for the user.

4. The method of claim 1, further comprising performing a windowing function for each of the plurality of users based upon the optimized guard band and the optimized guard duration.

5. The method of claim 1, further comprising storing the guard band and the guard duration for each of the plurality of users in a lookup table.

6. The method of claim 1, further comprising performing interference-based scheduling for each of the plurality of users prior to generating the OFDM signal.

7. The method of claim 6, wherein performing interference-based scheduling for each of the plurality of users, further comprises:
   grouping users with similar received power levels and similar signal-to-interference ratios (SIR) adjacent to each other.

8. The method of claim 7, wherein performing interference-based scheduling for each of the plurality of users, further comprises:
   calculating a similarity metric for each of the plurality of users, wherein the similarity metric for each user of the plurality of users is equal to a difference between the signal-to-interference ratio (SIR) of the user and the received power level of the user;
   determining an allowed interference level for each of the plurality of users; and
   ordering the users in an ascending or descending order based upon the similarity metric calculated for each of the plurality of users.

9. The method of claim 8, further comprising, if two users have the same similarity metric, ordering the users with the same similarity metric based upon the received power level of the adjacent user.

10. The method of claim 8, further comprising, comparing the received power level on both sides of the user and if the received power level on both sides of the user is the same, positioning the user with the higher signal-to-interference ratio (SIR) to a frame edge of the OFDM symbol.

11. The method of claim 1, wherein the user is selected from an enhanced mobile broadband (eMBB) user, a massive machine type communications (mMTC) user, and an ultrareliable low-latency communications (URLLC) user.

12. An apparatus, comprising one or more integrated circuit devices configured to:
   receive a data symbol vector comprising data mapped to a subcarrier associated with one of a plurality of users operating in adjacent bands of an OFDM-based communication system;
   identify a power offset (PO) between the plurality of users operating in adjacent bands of the OFDM-based communication system;
   identify a required signal-to-interference ratio (SIR) for the plurality of users;
   optimize a guard band for each of the plurality of users based upon the identified power offset and the identified required signal-to-interference ratio (SIR) for each of the plurality of users;
   optimize a guard duration for each of the plurality of users based upon the identified power offset and the identified required signal-to-interference ratio (SIR) for each of the plurality of users; and
   generate an OFDM signal using the optimized guard bands and the optimized guard duration for each of the plurality of users.

13. The apparatus of claim 12, wherein the one or more integrated circuit devices are further configured to:
   determine an allowed interference level for each of the plurality of users; and
   maximize a spectral efficiency of the OFDM signal, wherein the spectral efficiency is maximized when the power offset (PO) of the user combined with the signal-to-interference ratio (SIR) of the user is less than the allowed interference level for the user.

14. The apparatus of claim 12, wherein the one or more integrated circuit devices are further configured to perform interference-based scheduling for each of the plurality of users prior to generating the OFDM signal.

15. The apparatus of claim 13, wherein the one or more integrated circuit devices are further configured to group users with similar received power levels and similar signal-to-interference ratios (SIR) adjacent to each other.

16. A non-transitory computer readable storage medium having computer program instructions stored thereon that, when executed by one or more processors, cause the one or more processors to perform a method of generating an orthogonal frequency division multiplexing (OFDM) symbol for transmission in a communication channel using adaptive guard bands and adaptive guard durations, the method comprising:

receiving a data symbol vector comprising data of a plurality of users operating in adjacent bands of an OFDM-based communication system;

identifying a power offset (PO) between the plurality of users operating in the adjacent bands of the OFDM-based communication system;

identifying a required signal-to-interference ratio (SIR) for each of the plurality of users;

optimizing a guard band for each of the plurality of users based upon the identified power offset and the identified required signal-to-interference ratio (SIR) for each of the plurality of users;

optimizing a guard duration for each of the plurality of users based upon the identified power offset and the identified required signal-to-interference ratio (SIR) for each of the plurality of users; and generating a first OFDM signal using the optimized guard bands and the optimized guard duration for each of the plurality of users.

17. The non-transitory computer readable storage medium of claim 16, wherein the method further comprises:

determining an allowed interference level for each of the plurality of users; and maximizing a spectral efficiency of the OFDM signal, wherein the spectral efficiency is maximized when the power offset (PO) of the user combined with the signal-to-interference ratio (SIR) of the user is less than the allowed interference level for the user.

18. The non-transitory computer readable storage medium of claim 16, wherein the method further comprises grouping users with similar received power levels and similar signal-to-interference ratios (SIR) adjacent to each other.

* * * * *

UNITED STATES PATENT AND TRADEMARK OFFICE
CERTIFICATE OF CORRECTION

PATENT NO. : 10,411,819 B1  
APPLICATION NO. : 16/024051  
DATED : September 10, 2019  
INVENTOR(S) : Ali Fatih Demir and Huseyin Arslan Page 1 of 1

It is certified that error appears in the above-identified patent and that said Letters Patent is hereby corrected as shown below:

On the Title Page

Item (71) Applicants and Item (72) Inventors should read:  
(71) Applicants: Ali Fatih Demir, Tampa, FL (US); Huseyin Arslan, Tampa, FL (US)  
(72) Inventors: Ali Fatih Demir, Tampa, FL (US); Huseyin Arslan, Tampa, FL (US)

Signed and Sealed this  
Twenty-second Day of October, 2019

Andrei Iancu  
*Director of the United States Patent and Trademark Office*